United States Patent Office 3,355,451
Patented Nov. 28, 1967

3,355,451
NEW SEMICARBAZONES AND PROCESSES FOR THEIR PREPARATION
Wilfred Herbert Hook, Brooklands, Sale, and Jack Raymond Green, Romiley, England, assignors to Geigy Chemical Corporation, Greenburgh, N.Y., a corporation of Delaware
No Drawing. Filed Nov. 27, 1964, Ser. No. 414,430
Claims priority, application Great Britain, Nov. 28, 1963, 46,971/63
6 Claims. (Cl. 260—240)

The present invention relates to new simicarbazones of 5-nitro-2-furaldehyde which possess useful pharmacological, in particular, antimicrobial, properties, as well as to processes for producing said semicarbazones.

It has been found that 5-nitro-2-furaldehyde semicarbazones of the general formula

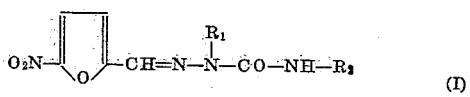

(I)

wherein $R_1$ is a 2-hydroxy-1-cycloalkyl radical with 5–7 ring members and 5–9 carbon atoms, and $R_2$ is hydrogen or an alkyl radical with at most 3 carbon atoms, exhibit outstanding antimicrobial activities, in particular antifungal and antibacterial activity. In living organisms they are active, e.g. against general staphylococcal infections.

In the new compounds of the general Formula I, $R_1$ is, for example, the 2-hydroxy-cyclopentyl-2-hydroxy-cyclohexyl and 2-hydroxy-cycloheptyl radical or one of these radicals substituted by one or two lower alkyl groups, e.g. methyl, isopropyl or tertiary butyl groups; $R_1$ contains a total number of at most 9 carbon atoms. $R_2$ is, for example, hydrogen, methyl, ethyl, n-propyl or isopropyl.

The new compounds of the Formula I defined above are prepared by reacting 5-nitro-2-furaldehyde or a functional derivative thereof with a semicarbazide of the general Formula II

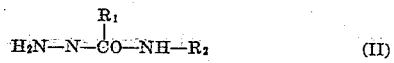

(II)

or a salt thereof wherein $R_1$ and $R_2$ have the meanings given above, in a suitable solvent such as, e.g. ethanol or glacial acetic acid. If necessary, the reaction may be promoted by short heating or by the addition of a condensing agent such as, e.g. sodium acetate. Instead of the free aldehyde, as a functional derivative thereof, its diacetate, for example, may be used. Instead of the semicarbazide, a reactive derivative of the semicarbazide, for eaxmple, the acetone semicarbazone may be used.

According to a further process, the new compounds of general Formula I are prepared by treating a semicarbazone of general Formula III

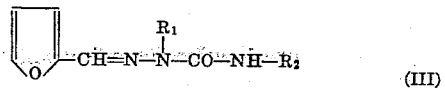

(III)

wherein $R_1$ and $R_2$ have the meanings given above, with a nitrating agent, preferably with nitric acid, e.g. in glacial acetic acid in the presence of a water binding agent such as sulphuric acid, or in acetic anhydride, and if necessary, hydrolysing the acetoxy compound obtained as immediate reaction product. The nitration is preferably carried out at low temperatures not exceeding 15° C., using concentrated or fuming nitric acid.

A third process for the production of the new compounds of general Formula I comprises reacting a hydrazone of the general Formula IV

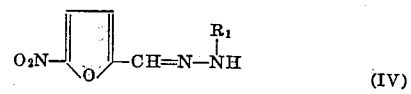

(IV)

wherein $R_1$ has the meaning given above, with cyanic acid or with an isocyanate of the general Formula V $$O=C=N-R_2'$$ (V)

wherein $R_2'$ represents an alkyl radical with at most 3 carbon atoms, in an inert solvent.

Due to their autimicrobial properties, the new compounds of general Formula I are particularly useful as antibacterial, antifungal and coccidiostatic agents. Thus, they are valuable as sole or additional active ingredients for antibacterial, antifungal and coccidiostatic compositions in either concentrated or read-for-use form. They can further be used as protective additives to organic materials of all kinds which are open to attack by bacteria or fungi.

The following examples further illustrate the production of the new compounds according to the invention. Parts are given as parts by weight.

*Example 1*

To a solution of 12.1 parts of 2-(2'-hydroxy-cyclopentyl)-hydrazine in 40 parts of water is added sufficient dilute acid to adjust the pH to 7. In the resulting solution 10.8 parts of potassium cyanate are dissolved. This solution is maintained at 30° C. for 2–3 hours with the occasional addition of dilute acid to keep the pH between 5 and 6. To the clear solution of 2-(2'-hydroxy-cyclopentyl)-semicarbazide hydrochloride are added 6.5 parts of 5-nitro-2-furaldehyde dissolved in 50 parts of ethanol. The precipitated yellow solid is collected by filtration, recrystallised from ethanol and dried in vacuum at 100° C. Thus is obtained 5-nitro-2-furaldehyde-2'-(2"-hydroxy-cyclopentyl)-semicarbazone which melts at 159–160° C.

The 2-(2'-hydroxy-cyclopentyl)-hydrazine may be prepared as follows:

A mixture of 21 parts of cyclopentene oxide, 88 parts of 100% hydrazine hydrate and 100 parts of methanol is heated at reflux for 24 hours. Removal of the methanol and excess hydrazine hydrate by distillation, finally under reduced pressure gives 2-hydroxy-cyclopentyl hydrazine as a colourless viscous liquid.

Similarly can be prepared 5-nitro-2-furaldehyde-2'-(2"-hydroxy-cyclohexyl)-semicarbazone melting at 181–182° C., 5-nitro-2-furaldehyde-2'-(2" - hydroxy-cycloheptyl)-semicarbazone melting at 164–165° C., and 5-nitro-2-furaldehyde - 2' - (2" - hydroxy - 4"(or 5") - methyl-cyclohexyl)-semicarbazone melting at 183–184° C.

Similarly may be prepared:

5-nitro-2-furaldehyde-2'-(2"-hydroxy-3"-methyl-cyclopentyl)-semicarbazone;
5-nitro-2-furaldehyde-2'-(2"-hydroxy-5"-methyl-cyclopentyl)-semicarbazone;
5-nitro-2-furaldehyde-2'-(2"-hydroxy-3",5"-dimethyl-cyclopentyl)-semicarbazone;
5-nitro-2-furaldehyde-2'-(2"-hydroxy-3",4",5"-trimethyl-cyclopentyl)-semicarbazone;
5-nitro-2-furaldehyde-2'-(2"-hydroxy-2"-methyl-cyclohexyl)-semicarbazone;
5-nitro-2-furaldehyde-2'-(2"-hydroxy-3"-methyl-cyclohexyl)-semicarbazone;

5-nitro-2-furaldehyde-2'-(2"-hydroxy-6"-methyl-cyclohexyl)-semicarbazone;
5-nitro-2-furaldehyde-2'-(2"-hydroxy-3",5"'-dimethyl-cyclohexyl)-semicarbazone;
5-nitro-2-furaldehyde-2'-(2"-hydroxy-4",6"-dimethyl-cyclohexyl)-semicarbazone;
5-nitro-2-furaldehyde-2'-(2"-hydroxy-3",6"-dimethyl-cyclohexyl)-semicarbazone;
5-nitro-2-furaldehyde-2'-(2"-hydroxy-3",6"-diethyl-cyclohexyl)-semicarbazone.

Example 2

To a solution of 20.8 parts of 2-(2'-hydroxy-cyclopentyl)-hydrazine in 35 parts of dry ethanol and 35 parts of dry ether is added a solution of 12.5 parts of ethyl isocyanate in 35 parts of dry ether. During the 40 minutes' addition the temperature is maintained at 4–6° C. by means of an ice bath. After stirring for 1½ hours at 25° C., the pH of the solution is adjusted to 2 by the addition of concentrated hydrochloric acid. The resulting two layers are separated. To the clear aqueous solution of 2-(2'-hydroxy-cyclopentyl)-4 - ethyl-semicarbazide hydrochloride are added 16 parts of 5-nitro-2-furaldehyde dissolved in 160 parts of ethanol. Following the addition of 40 parts of saturated sodium acetate solution the precipitated yellow solid is collected by filtration, recrystallised from 25% aqueous ethanol and dried in vacuum at 100° C. Thus is obtained 5-nitro-2-furaldehyde-2'-(2"-hydroxy-cyclopentyl)-4'-ethyl-semicarbazone which melts at 164–165° C.

Similarly may be prepared:

5-nitro-2-furaldehyde-2'-(2"-hydroxy-cyclopentyl)-4'-methyl-semicarbazone;
5-nitro-2-furaldehyde-2'-(2"-hydroxy-cyclohexyl)-4'-methyl-semicarbazone; and
5-nitro-2-furaldehyde-2'-(2"-hydroxy-cycloheptyl)-4'-methyl-semicarbazone.

Example 3

A mixture of 7.05 parts of 5-nitro-2-furaldehyde, 30 parts of glacial acetic acid and 11.8 parts of 2-(2'-hydroxy-cyclopentyl)-4-phenyl-semicarbazide is heated at 80° C. for 1 minute. The yellow solid obtained on cooling is collected by filtration, recrystallised from 60% aqueous dimethyl formamide and dried in vacuum at 100° C. The 5-nitro-2-furaldehyde-2'-(2" - hydroxy-cyclopentyl) - 4'-phenyl-semicarbazone so obtained melts at 181° C. (decomposition).

The 2-(2'-hydroxy-cyclopentyl)-4-phenyl-semicarbazide may be prepared as follows:

A solution of 21 parts of phenyl isocyanate in 35 parts of ether is added to a solution of 20.5 parts of 2-(2'-hydroxy-cyclopentyl)-hydrazine in 35 parts of ether and 35 parts of dry ethanol over 1 hour at 5° C. The precipitated white solid is collected by filtration and washed with ether. Thus is obtained 2-(2'-hydroxy-cyclopentyl) - 4-phenyl-semicarbazide which melts at 166–168° C.

Example 4

A mixture of 20 parts of 5-nitro-2-furaldehyde-N'-(2"-hydroxycyclopentyl)-hydrazone and 9 parts of phenyl isocyanate is heated on a steam bath for 1½ hours. 100 parts of chloroform are added and the precipitated yellow solid is collected by filtration, recrystallised from 60% aqueous dimethyl formamide and dried in vacuum at 100° C. The 5-nitro-2-furaldehyde-2'-(2" - hydroxycyclopentyl)-4'-phenyl-semicarbazone so obtained melts at 181° C. (decomposition) and is identical to that obtained in Example 3.

The 5-nitro-2-furaldehyde-N'-(2"-hydroxycyclopentyl)-hydrazone may be prepared as follows:

A mixture of 8 parts of 5-nitro-2-furaldehyde, 67 parts of 0.5 N acetic acid, 27 parts of ethanol and 10.7 parts of acetone-N'-(2" - hydroxycyclopentyl) - hydrazone is stirred at room temperature for 1 hour. After cooling to 5° C., the red solid which separates is collected by filtration and dried in vacuum at 40° C. Thus is obtained 5-nitro-2-furaldehyde-N'-(2"-hydroxycyclopentyl) - hydrazone which melts at 56–58° C.

The acetone-N'-(2" - hydroxycyclopentyl) - hydrazone may be prepared as follows: 93 parts of 2-(2'-hydroxycyclopentyl)-hydrazine is added to 170 parts of acetone with cooling. After stirring for 1 hour at room temperature the excess acetone is removed by distillation. From the residue acetone-N'-(2"-hydroxycyclopentyl) - hydrazone can be distilled, boiling at 86–87° C. at 0.2 torr.

Example 5

A mixture of 14.1 parts of 5-nitro-2-furaldehyde, 26.1 parts of acetaldehyde-2'-(2"-hydroxycyclopentyl)-4'-phenyl-semicarbazone, 96 parts of ethanol and 200 parts of 0.5 N acetic acid is stirred at room temperature for 1 hour. The yellow solid which separates is collected by filtration, recrystallised from 60% aqueous dimethyl formamide and dried in vacuum at 100° C. Thus is obtained 5-nitro-2-furaldehyde - 2'-(2"-hydroxycyclopentyl)-4'-phenyl-semicarbazone which melts at 181° C. and is identical to that obtained in Example 3.

The acetaldehyde-2'-(2"-hydroxycyclopentyl)-4'-phenyl-semicarbazone may be prepared as follows:

5.9 parts of 2-(2'-hydroxycyclopentyl)-4-phenyl-semicarbazide are added to 12 parts of acetaldehyde with cooling. After removing the excess acetaldehyde by distillation, 30 parts of 40% aqueous ethanol is added. The precipitated white solid is collected by filtration, recrystallised from ethanol and dried at 60° C. in vacuum. Thus is obtained acetaldehyde-2'-(2"-hydroxycyclopentyl-(4'-phenyl-semicarbazone which melts at 120° C.

Example 6

A mixture of 4.1 parts of concentrated nitric acid, 40 parts of glacial acetic acid and 11 parts of acetic anhydride is added to a mixture of 9.5 parts of furaldehyde-2'-(2"-hydroxycyclopentyl)-4'-phenyl-semicarbazone, 100 parts of glacial acetic acid and 25 parts of acetic anhydride at 10° C. over 15 minutes. After pouring onto ice the brown oil which separates slowly crystallises to give a yellow solid which is collected by filtration and dried in vacuum at 40° C. Examination of this crude product by thin layer chromatography shows the presence, as the main component, of 5-nitro - 2 - furaldehyde-2'-(2"-hydroxycyclopentyl)-4'-phenyl-semicarbazone identical with the product described in Example 3.

The furaldehyde-2'-(2"-hydroxycyclopentyl)-4'-phenyl-semicarbazone may be prepared as follows:

A mixture of 9.6 parts of furaldehyde, 23.5 parts of 2-(2'-hydroxycyclopentyl)-4-phenyl-semicarbazide and 50 parts of ethanol is refluxed for 1½ hours. 50 parts of water is added and the precipitated grey solid is collected by filtration and dried in vacuum at 80° C. The furaldehyde-2'-(2"-hydroxycyclopentyl) - 4' - phenyl-semicarbazone so obtained melts at 138–140° C.

We claim:

1. A 5-nitro-2-furaldehyde semicarbazone of the formula

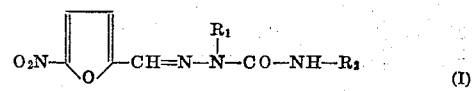

(I)

wherein

R₁ is a 2-hydroxy-1-cycloalkyl radical with 5–7 ring members and 5–9 carbon atoms, and R₃ is a member selected from the group consisting of hydrogen and alkyl with at most 3 carbon atoms.

2. 5-nitro-2-furaldehyde-2'-(2"-hydroxy - cyclopentyl)-semicarbazone.

3. 5-nitro-2-furaldehyde - 2'-(2"-hydroxy-cyclohexyl)-semicarbazone.

4. 5-nitro - 2- furaldehyde - 2' - (2" - hydroxy-4"(5")-methyl-cyclohexyl)-semicarbazone, having a melting point of 183–184° C.

5. 5-nitro-2-furaldehyde-2' - (2"-hydroxy-cycloheptyl)-semicarbazone.

6. A compound according to claim 1 which is 5-nitro-2-furaldehyde - 2' - (2"-hydroxy-cyclohexyl)-4'-methyl-semicarbazone.

References Cited

Chemical Abstracts, vol. 54, column 12091 (1960), (abstract of Kawabe et al.).

Chemical Abstracts, vol. 63, 18031 (1905), (abstract of Netherlands application 6,413,813).

JOHN D. RANDOLPH, *Primary Examiner.*